(12) United States Patent
Schumski

(10) Patent No.: US 11,185,050 B2
(45) Date of Patent: Nov. 30, 2021

(54) MINERAL BASED ANIMAL LITTER

(71) Applicant: The Andersons, Inc., Maumee, OH (US)

(72) Inventor: Joseph Schumski, Maumee, OH (US)

(73) Assignee: THE ANDERSONS, INC., Maumee, OH (US)

(*) Notice: Subject to any disclaimer, the term of this patent is extended or adjusted under 35 U.S.C. 154(b) by 252 days.

(21) Appl. No.: 16/407,883

(22) Filed: May 9, 2019

(65) Prior Publication Data

US 2019/0343067 A1 Nov. 14, 2019

Related U.S. Application Data

(60) Provisional application No. 62/669,000, filed on May 9, 2018.

(51) Int. Cl.
*A01K 1/015* (2006.01)
*A01K 1/01* (2006.01)

(52) U.S. Cl.
CPC ............ *A01K 1/0155* (2013.01); *A01K 1/011* (2013.01); *A01K 1/0154* (2013.01)

(58) Field of Classification Search
CPC ... A01K 1/0155; A01K 1/0154; A01K 1/0152
See application file for complete search history.

(56) References Cited

U.S. PATENT DOCUMENTS

| | | | |
|---|---|---|---|
| 2012/0260860 A1* | 10/2012 | Drief | A01K 1/0155 119/173 |
| 2012/0318205 A1* | 12/2012 | Kuras | A01K 1/0154 119/173 |
| 2013/0305997 A1* | 11/2013 | Miller | A01K 1/0154 119/173 |
| 2014/0000525 A1* | 1/2014 | Schumski | A01K 1/0155 119/173 |
| 2015/0150214 A1* | 6/2015 | Seguin-Laur | A01K 1/0154 119/172 |
| 2016/0135421 A1* | 5/2016 | Cortner | A01K 1/0154 119/172 |

* cited by examiner

*Primary Examiner* — Trinh T Nguyen
(74) *Attorney, Agent, or Firm* — Blue Filament Law PLLC

(57) ABSTRACT

A clumping litter is provided that includes a hydrophilic light weight material, a clumping agent, and a mineral particulate combined to form pellets sized to from 4 to 40 US mesh in diameter. A clumping litter is also provided in which the hydrophilic light weight material is wood flour, the mineral particulate is dolomite or limestone is also provided that also includes sodium bicarbonate, a clumping agent, and solubilized citric acid combined to form the pellets. A clumping litter is also provided in which the hydrophilic light weight material is a paper pulp and powdered clay that are combined with mineral particulate combined to form the pellets.

12 Claims, No Drawings

MINERAL BASED ANIMAL LITTER

RELATED APPLICATIONS

This application is a non-provisional application that claims priority benefit of U.S. Provisional Application Ser. No. 62/669,000 filed May 9, 2018; the contents of which are hereby incorporated by reference.

FIELD OF THE INVENTION

The invention in general relates to a mineral based clumping litter and in particular, to an animal litter formed therefrom with an internal clumping agent.

BACKGROUND OF THE INVENTION

The production of animal litter from various mineral and biomass granular materials that are decorated with urine-activated clumping agents is well known to the art. Representative examples are found in U.S. Pat. Nos. 5,458,091 and 6,053,125. While such animal litter products have generally been effective, the generally modest urine absorption by a base granule has meant that urine entrainment has had to occur through the wetting and activation of the surface decorating clumping agent. This mechanism results in a less efficient use of litter than would otherwise be obtainable provided the base granule was urine absorbent. As a result, odor control remains problematic.

Additional problems persist as to variation in base material supplies and quality. As the cost of litter production is tied to material costs, variability adds to production planning complexity.

Thus, there exists a need for an improved mineral based animal litter and absorbent material inclusive with a clumping agent mixture that affords superior properties and performance.

SUMMARY OF THE INVENTION

A clumping litter is provided that includes a hydrophilic light weight material, a clumping agent, and a mineral particulate combined to form pellets sized to from 4 to 40 US mesh in diameter. A clumping litter is also provided in which the hydrophilic light weight material is wood flour, the mineral particulate is dolomite or limestone is also provided that also includes sodium bicarbonate, a clumping agent, and solubilized citric acid combined to form the pellets. A clumping litter is also provided in which the hydrophilic light weight material is a paper pulp and powdered clay that are combined with mineral particulate combined to form the pellets.

DETAILED DESCRIPTION OF THE PREFERRED EMBODIMENTS

The present invention has utility as a litter to absorb aqueous liquids such as animal urine and environmental spills. By using various combinations of minerals in concert with a synergistic combination of a light weight hydrophilic material, a litter is formed that overcomes several limitations of conventional litters and absorbents and has exceptional overall properties. The present invention by inclusion of a clumping agent within the interior of the litter pellet affords advantages as to reducing processing steps of surface coating, promoting greater pellet-pellet adhesion, or combinations thereof.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

Embodiments of the inventive litter include a light weight hydrophilic material. The light weight hydrophilic material operative in the present invention include those conventionally mixed with minerals, to impart great urine or aqueous fluid absorption and an overall reduction in density. In those embodiments of the present invention particularly well suited as animal litters, the density of light weight hydrophilic material is typically 1.8 or lower and constitutes the second most plentiful component by weight, after the mineral particulate.

Light weight hydrophilic materials operative herein illustratively include perlite, wood flour; saw dust, paper pulp, clay powder (also referred to herein as powdered clay), dried distillers grain, soybean meal, grain dust, corn cob, miscanthus, vermiculite, zeolites, diatomaceous earth, and combinations thereof. It is appreciated that when clay powder, zeolites, diatomaceous earth, or a combination thereof are present, a reduced density secondary light weight hydrophilic material is present to attain a desired density of less than 1.8. The size of the particles is largely immaterial to the function, but particles able to pass screen sizes between −6 and +400 are generally operative herein either as distinct monolithic particles or are agglomerated fines that collectively form a particle with resort to a binder or other conventional techniques. It should be appreciated that in animal litters, the light weight hydrophilic material varies with the nature of particles from 5 to 40 total weight percent. In some inventive embodiments, the light-weight hydrophilic material particles are sized larger than the mineral particles. In some inventive embodiments, the light-weight hydrophilic material is sized −20 US mesh (less than 841 microns).

A clumping agent is provided, in some inventive embodiments, to combat the generation of dust that is disfavored for usage as a litter owing to indoor air quality. Clumping agents operative herein illustratively include cellulosic materials modified to include a portion of aliphatic derivation to include a degree of ethylation or methylation, starches, guar gum, locust bean gum, and combinations thereof. Specific cellulosic materials operative in the present invention include carboxymethylcellulose (CMC), hydroxyethylcellulose, hydroxy-methylethylcellulose, hydroxyethylpropylcellulose, methylhydroxyethyl-cellulose, and a combination thereof. Sodium carboxymethylcellulose represents a common, low toxicity cellulosic material operative in the present invention. The clumping agent is present in certain inventive embodiments at 1 to 10 total weight percent. The cellulosic material component is well suited for spray application to the large volume of mineral and light weight hydrophilic material particles of an inventive litter material.

In one embodiment carboxymethylcellulose (CMC), wood flour, as the light weight hydrophilic material, and dolomite or limestone have a surprising synergy revealing an improved result. Here, an effective amount of dolomite, light weight hydrophilic material particulate, and CMC is mixed, where the mixture forms litter pellets alone and without resort to an optional binder. Bicarbonate salts and/or citric acid are added in in amounts of from 1 to 10 total weight percent to complement the odor control properties of the mineral component.

It is appreciated that in addition to the aforementioned components, various additives can be incorporated into a material according to the present invention. These additives illustratively include a colorant, a fragrance, an acid neutralizing agent, and a desiccant. When present, a colorant or fragrance is typically present from 1 ppm to 10 dry total weight percent. When present, an acid neutralizing agent is typically present from 0.05 to 10 dry total weight percent. When present, a desiccant is typically present from 0.05 to 10 dry total weight percent. The size of the resulting litter pellets are from 4 to 40 US mesh in diameter.

An inventive mineral based litter material typically formed by mixing the mineral and light weight hydrophilic material particles together and then to this mixture is added a clumping agent. Typically, clumping agent is readily added in a pan agglomerator or in a conventional fluidizing mixer. In some inventive embodiments, the same or a different clumping agent is applied as a surface coating on the litter pellets containing internal clumping agent. Coating is readily accomplished with techniques illustratively including spray coating and dip coating.

In one embodiment, an inventive mineral based litter material is formed by mixing a mineral and light weight hydrophilic material particulate together and a clumping agent added thereto to form an inventive litter pellet. In still other embodiments, the resulting litter pellet is overcoated by the same clumping agent or a different clumping agent.

The resultant inventive animal litter clump has a mechanical adhesion strength of typically greater than 250 kg/cm$^2$ and often between 300 kg/cm$^2$ and 450 kg/cm$^2$. Clump strength is readily measured by a procedure as detailed in US 2009/0308323, the contents of which are hereby incorporated by reference in total, with particular reference to [0071] and [0072]. The strength of a clump is also readily expressed as a percentage of the maximal strength as measured as a function of time.

The present invention is further detailed with respect to the following non-limiting examples. These examples are not intended to limit the scope of any claims directed to the present invention but rather to illustrate with specificity certain embodiments of the present invention and attributes thereof.

EXAMPLES

Example 1

A mineral based litter material is formed by mixing a perlite, a clumping agent, and a mineral particulate. The perlite is present in a range from 10-30% of the litter material, and is sized with an approximately −20 U.S. mesh material. The clumping agent is formed with starch solids and makes up from 1-10% of the litter material. The starch solids are sized with a −80 U.S. mesh material prior to being cooked to form a viscous clumping agent. The mineral is present from 50-80% of the litter material, where at least 50% of the mineral is less than −100 U.S. Mesh.

In a specific inventive embodiment, the mineral based litter material is formed with 25% perlite, 6% binder, and 69% mineral. The size of the resulting litter pellets are from 4 to 40 US mesh in diameter.

A clump is allowed to form at room temperature and measured as to strength. The results as a percentage of maximal strength observed are: 15 min=97%, 1 hr=96%, 24 hr=96%, 48 hr=98%. Clump strength at 100% is in excess of 250 kg/cm$^2$.

The process for determining clump strength as percent is as follows:

Equipment
8 inch diameter ¾ inch mesh screen
8 inch diameter screen pan
Balance capable of reading 0.1 grams
Container capable of holding litter to at least a 3 inch depth and up to 6 clumps (ex: plastic shoe box 7×9× 4.5")
Syringe capable of delivering at least 25 mL (ex: a 60 mL syringe)
Slotted spoon, rounded (cat litter scoop)
2% NaCl solution (table salt w/de-ionized water) at room temperature Procedure
1. Record the sample batch no./ID, test date, and sample comments/description on the Test Results Chart.
2. Weigh the screen and the pan (in grams).
3. Incorporate these weights into the Excel calculations for % Hardness on the Test Results Chart.
4. Place the screen on the pan and place these on a solid surface, such as a bench top.
5. Near the screen/pan and on a vertical wall or post, put a mark that is 12 inches above the screen mesh.
6. Pour the mixed litter material into a container (flat bottom plastic shoe box) to a depth of at least 3 inches.
7. Level the top surface of the cat litter by gently shaking and/or using a leveling tool. Avoid a slanted surface.
8. Load a 60 mL syringe with the salt solution to the 50 mL mark (to deliver two 25 m charges).
9. Hold the syringe steady, about one inch above the litter. Add 25 mL of the salt solution to one location trying to target a 3 sec delivery time. The liquid should not pool on top of the litter.
10. Add the salt solution to 2 more locations making sure clumps are not too close to each other.
11. For each clump, scoop out the clump after 15 minutes using the slotted spoon. Make sure to get under the clump and to not damage adjoining clumps.
12. Tap the scoop to get rid of most of the loose debris. Gently roll clump in hands to get rid of the rest of the loose debris.
13. Holding the clump with the hand, position it so it will drop on its side onto the middle of the screen. The drop is to be a 12 inch drop to the mesh (use the 12 inch mark).
14. Quickly release the clump without spinning it, allowing it to free fall 12 inches to the center of the screen.
15. Record the clump condition: H for hard; S for soft (but intact); C for cracked; CA for cracked apart; DC for decapitated (top part of lump fell off); and FA for fell apart into multiple pieces.
16. Place the pan, the screen, what is left of the clump, and the debris (in the pan) on the balance.
17. Record the weight (in grams to 0.1 g) as W1 on the Test Results Chart.
18. Remove the screen (with residual clump) from the pan (with debris) and weigh the screen (with residual clump) separately. Record this weight as W2 on the Test Results Chart.
19. Discard residual clump and debris. Clean the screen and the pan with the brush thoroughly.
20. Calculate an average Percent Hardness (% H) (see calculations below).

21. Repeat triplicate clump testing for times of 1 hour, 24, hours, and 48 hours.

Calculations

W1=weight of screen, pan, residual clump, and debris
W2=weight of screen and residual clump
% H=% Hardness of the Clump=(100%)×(W2−S)/(W1−S−P)
Where S=wt of Screen in grams
Where P=wt of Pan in grams Example 2

A mineral based litter material is formed by mixing a wood flour and other lightweight materials, dolomite, sodium bicarbonate, a clumping agent including carboxymethylcellulose (CMC) and other optional clumping agents, and a binder. The wood flour and other optional lightweight materials are present in a range from 5-40% of the litter material, and is sized with an approximately −20 U.S. mesh material. Dolomite is present from 40-90% of the litter material, where at least 50% of the mineral is less than −100 U.S. mesh. The sodium bicarbonate is present from 1-10%, where at least 50% of the mineral is less than −100 U.S. mesh. The CMC and additional optional clumping agents are present from 1-10%, where at least 50% of the clumping agents are less than −40 U.S. mesh. The binder is formed of a citric acid that is solubilized and added to the mixture.

In a specific inventive embodiment, the mineral based litter material is formed with 20% wood flour and other lightweight materials, 65% dolomite, 5% sodium bicarbonate, 5% CMC and additional optional clumping agents, and 5% of the binder formed with solubilized citric acid. The size of the resulting litter pellets are from 4 to 40 US mesh in diameter. In some embodiments the resulting litter pellets from 12 to 40 US mesh in diameter.

Example 3

A limestone mineral based litter material is formed by mixing paper pulp, powder clay, powder limestone. The paper pulp (solid) is present in a range from 5-20% of the litter material, where 30-70% is moisture. Powder clay is present from 20-40% of the litter material, where at least 50% of the mineral is less than −200 U.S. mesh. The powder limestone or mineral is present from 40-75%, where at least 50% of the powder limestone and mineral is less than −100 U.S. mesh.

The mixture may be made in a high shear mixer in which the pulp may be mechanically separated to a desired particle size (−6 mesh to +40 mesh) and then agglomerated with the powdered materials.

In a specific inventive embodiment, the mineral based litter material is formed with 12% paper pulp, 30% powder clay, 5% sodium bicarbonate, and 58% of the powder limestone or mineral. The size of the resulting litter pellets are from 4 to 40 US mesh in diameter.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A clumping litter comprising:
   a paper pulp with a particle size of −6 mesh to +40 mesh;
   a powdered clay; and
   mineral particulate the mineral particles are sized such that at least 50% by weight of the mineral particles are −100 US mesh wherein said paper pulp is sized larger than the mineral particles combined to form a plurality of pellets sized to from 4 to 40 US mesh in diameter.

2. The litter of claim 1 wherein said powder clay is sized to where at least 50 percent of the powdered clay is less than −200 mesh.

3. The litter of claim 1 wherein said powdered clay is sized to where at least 50 percent of the powdered clay is less than −100 mesh.

4. The litter of claim 1 wherein said paper pulp is present at 5 to 20 total weight percent, said powdered clay is present at 20 to 40 total weight percent, and said mineral particulate is present at 40 to 75 total weight percent.

5. The liter of claim 1 further comprising sodium bicarbonate.

6. The liter of claim 5 wherein said sodium bicarbonate is present at 1 to 10 total weight percent.

7. The liter of claim 1 wherein said paper pulp is agglomerated with said powdered clay.

8. The liter of claim 1 wherein said mineral particulate comprises limestone.

9. The liter of claim 1 wherein mechanical adhesion strength is greater than 250 kg/cm$^2$.

10. The liter of claim 1 further comprising one or more additives.

11. The liter of claim 10 wherein the one or more additives comprise a colorant, a fragrance, an acid neutralizing agent, or a desiccant.

12. The liter of claim 11 wherein when present, the colorant or fragrance is present from 1 ppm to 10 dry total weight percent;
   wherein when present, the acid neutralizing agent is present from 0.05 to 10 dry total weight percent; and
   wherein when present, a desiccant is present from 0.05 to 10 dry total weight percent.

\* \* \* \* \*